Figure 2:
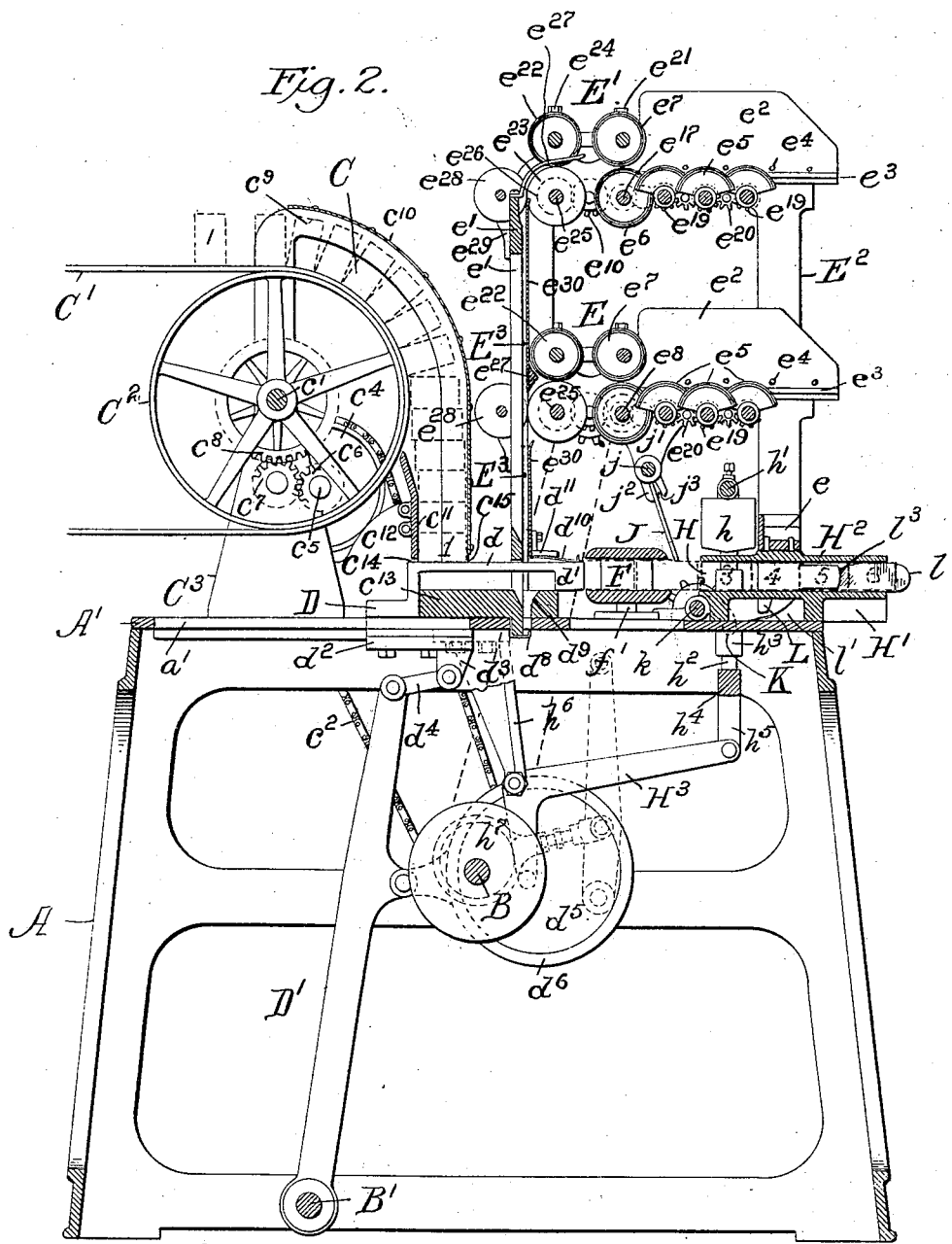

No. 763,999. PATENTED JULY 5, 1904.
T. G. McGIRR & M. B. FERGUSON.
MACHINE FOR APPLYING WRAPPERS TO CAKES OF SOAP OR OTHER ARTICLES.
APPLICATION FILED SEPT. 10, 1903.
NO MODEL. 6 SHEETS—SHEET 1.

No. 763,999. PATENTED JULY 5, 1904.
T. G. McGIRR & M. B. FERGUSON.
MACHINE FOR APPLYING WRAPPERS TO CAKES OF SOAP OR OTHER ARTICLES.
APPLICATION FILED SEPT. 10, 1903.
NO MODEL. 6 SHEETS—SHEET 2.

Witnesses
Inventors
Theodore G. McGirr
Milford B. Ferguson
By their Attorney

No. 763,999. PATENTED JULY 5, 1904.
T. G. McGIRR & M. B. FERGUSON.
MACHINE FOR APPLYING WRAPPERS TO CAKES OF SOAP OR OTHER ARTICLES.
APPLICATION FILED SEPT. 10, 1903.
NO MODEL. 6 SHEETS—SHEET 3.
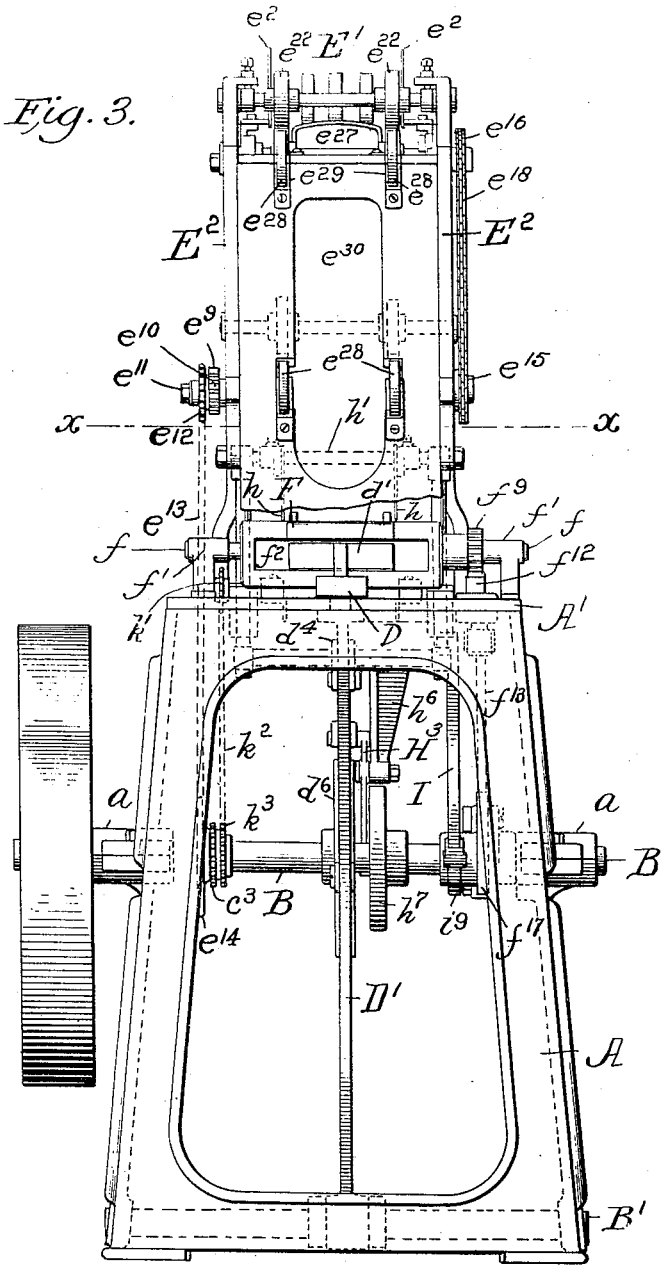
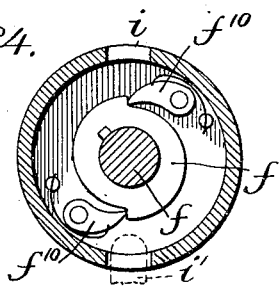

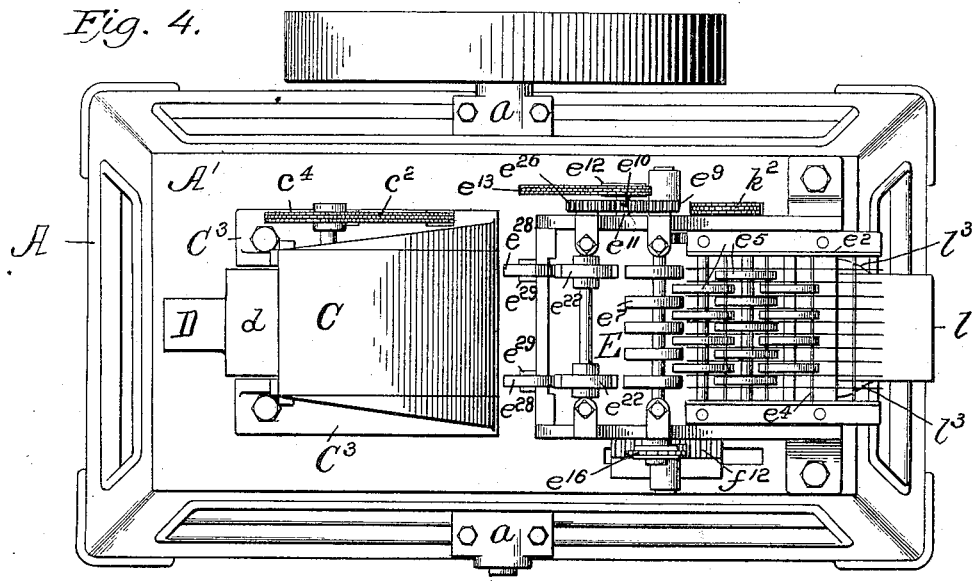
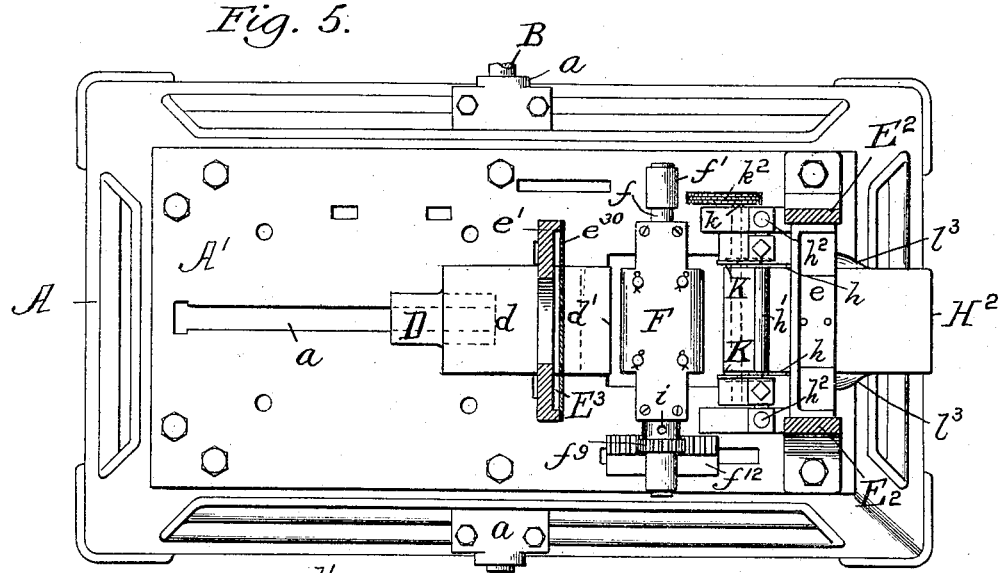
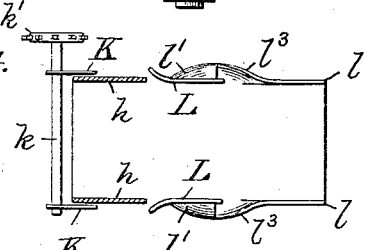

No. 763,999. PATENTED JULY 5, 1904.
T. G. McGIRR & M. B. FERGUSON.
MACHINE FOR APPLYING WRAPPERS TO CAKES OF SOAP OR OTHER ARTICLES.
APPLICATION FILED SEPT. 10, 1903.
NO MODEL. 6 SHEETS—SHEET 5.
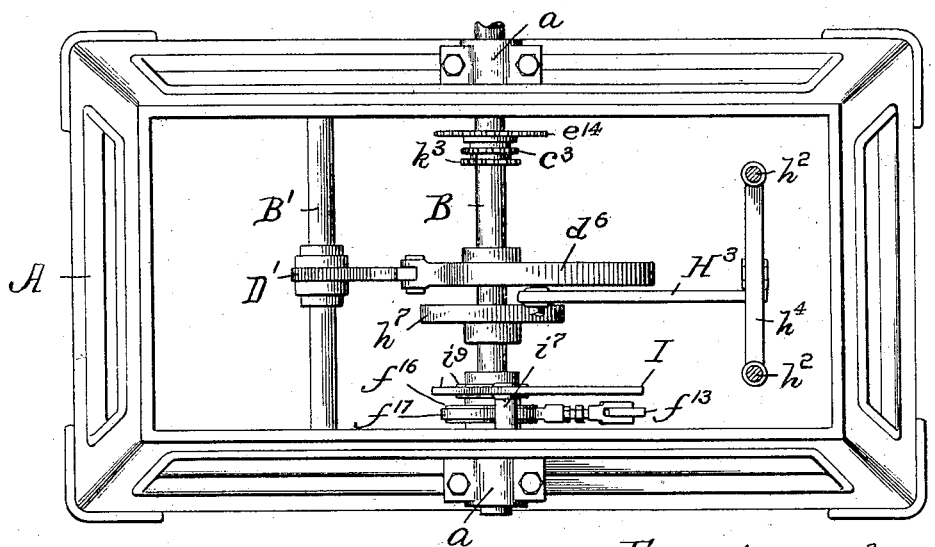
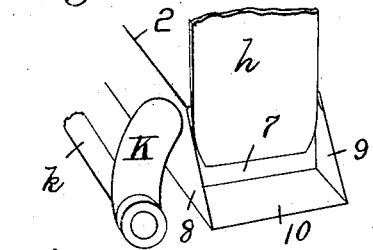
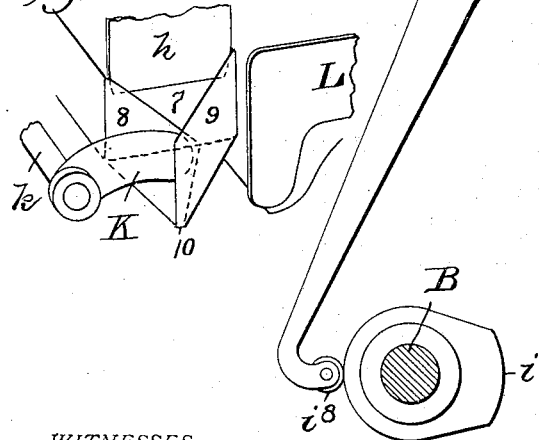
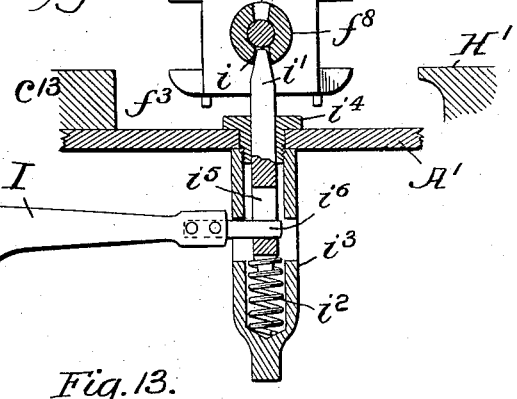
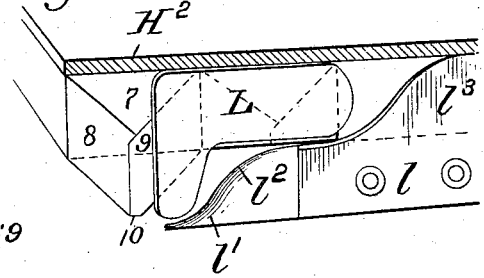
WITNESSES:
F. N. Roehrich
M. H. Lyon
INVENTORS.
Theodore G. McGirr
Milford B. Ferguson
BY
ATTORNEY.

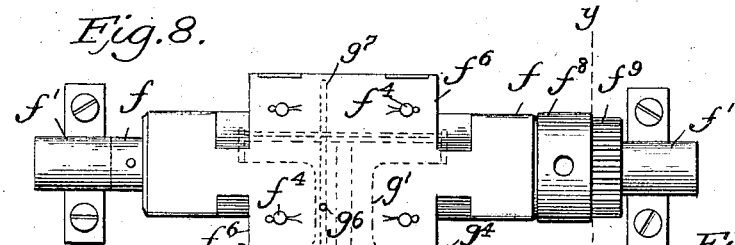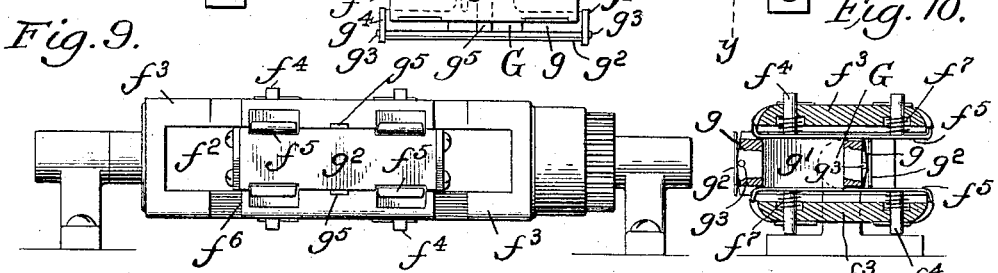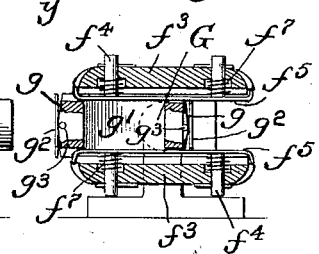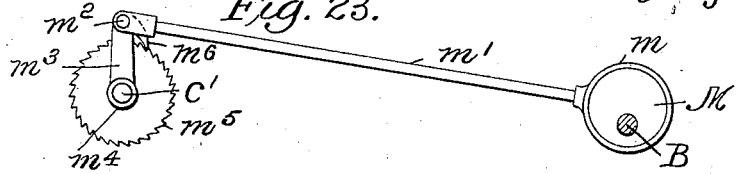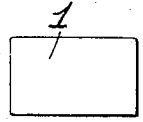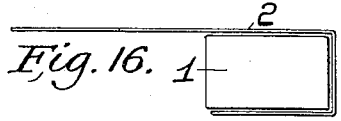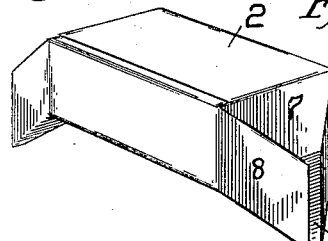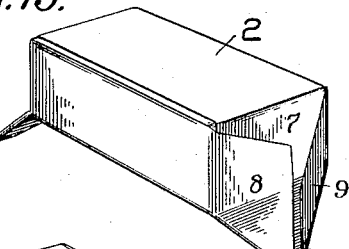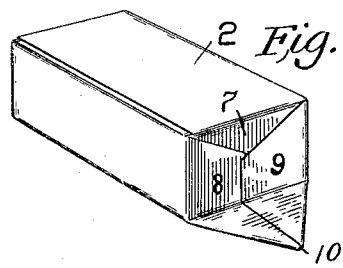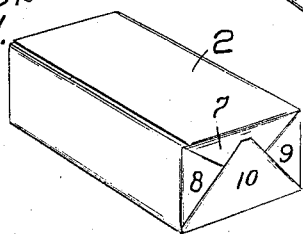

No. 763,999.

Patented July 5, 1904.

UNITED STATES PATENT OFFICE.

THEODORE G. McGIRR AND MILFORD B. FERGUSON, OF NEW YORK, N. Y., ASSIGNORS TO AMERICAN WRAPPING AND BOX MACHINE COMPANY, OF NEW YORK, N. Y., A CORPORATION OF NEW YORK.

MACHINE FOR APPLYING WRAPPERS TO CAKES OF SOAP OR OTHER ARTICLES.

SPECIFICATION forming part of Letters Patent No. 763,999, dated July 5, 1904.

Application filed September 10, 1903. Serial No. 172,584. (No model.)

*To all whom it may concern:*

Be it known that we, THEODORE G. McGIRR, a resident of the borough of Manhattan, in the county of New York, and MILFORD B. FER-GUSON, a resident of the borough of Brooklyn, in the county of Kings, in the city and State of New York, citizens of the United States, have invented certain new and useful Improvements in Machines for Applying Wrappers to Cakes of Soap or other Articles, of which the following is a specification.

Our invention relates to that class of wrapping-machines in which the articles to be wrapped are successively supplied to the machine and the several articles as thus supplied inclosed within paper or other suitable wrappers, which are folded about them preparatory to their shipment and sale.

In an application for Letters Patent filed in the United States Patent Office January 3, 1903, Serial No. 88,259, there is shown and described a machine for applying wrappers to soap and other articles in which the wrappers are supplied from a continuous roll and the wrapping of the articles effected through the intervention of vertically-operating blades, reciprocating tuckers, and coöperating folding devices by first bringing the soap or other article against the side of the wrapper in a position intermediate its length, and thereby folding the latter over the front edge and top and bottom of the former, next tucking in the forward and then the rear end of the wrapper as thus folded, and next completing the folding operation as the articles to be wrapped is passed through the machine to the discharging end thereof.

Our present invention is designed as an improvement upon that described in the aforementioned application for Letters Patent, and has for its object the production of a machine which while simple in construction and permitting of the application of an inner and outer wrapper to the article to be incased shall at the same time be more efficient in operation and capable of a higher rate of speed than has been possible with machines of this class as heretofore constructed.

To these ends the invention consists, first, in the means through which the cakes of soap or other articles are received and held in proper relationship to the other operating parts of the machine to permit of their being successively selected and carried forward to the wrapping devices; second, in the means whereby the selection of the successive cakes of soap or other articles from the receptacle in which they may be deposited and the carrying forward of the same to the folding devices are effected; third, in the wrapping devices by means of which the cakes of soap or other articles are inclosed within the wrapper, and, fourth, in various other constructions and combinations of parts, all as will hereinafter more fully appear.

Figure 22:
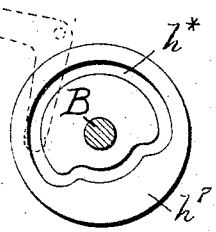

Referring to the accompanying drawings, which form a part of this specification, and in which the preferred embodiment of our invention is illustrated, Figure 1 is a side elevation of a machine constructed in accordance with one form of our invention; Fig. 2, a vertical longitudinal section of the same; Fig. 3, a rear end view of the machine with the soap-delivering devices omitted; Fig. 4, a top plan view of the machine; Fig. 5, a horizontal sectional view taken on the line *x x* of Fig. 3; Fig. 6, a view of the under mechanism of the machine with the top of the table and all the mechanism carried thereby removed; Fig. 7, a detail sectional view of the tumble-box, showing means for locking the same in position to receive a package; Fig. 8, a detail plan view of the tumble-box detached; Fig. 9, a detail edge view thereof similarly detached; Fig. 10, a detail cross-sectional view of the same; Figs. 11 to 13, inclusive, views illustrative of the manner of folding the ends of the wrapper; Fig. 14, a diagrammatic view showing the location of the various folding means in position; Figs. 15 to 21, inclusive, illustrate the position in which the soap intercepts the wrapper or wrappers and its various steps in completing the inclosure of the soap within the same; Fig. 22, a detail face view of the cam which operates the vertically-moving tuckers that tuck the ends of the wrapper after having been folded about the article and a portion of the bell-crank lever through which such tucking devices are operated therefrom; Fig. 23, a detail side view of modified means for rotating the pulleys which support and carry the endless feeding band or apron; and Fig. 24, a transverse section of the tumble-box trunnions, taken in the plane $y\ y$ of Fig. 8.

In the figures like characters of reference are employed to designate corresponding parts.

A indicates a base or frame, and A' a plate-like top or table which is secured thereto and which with the base or frame constitute the main housing of the machine in and upon which the various parts of the structure are arranged and mounted. As thus combined with the top or table A' this base or frame is provided with bearings $a$, in which is rotatively mounted the main driving-shaft B, while below this shaft and extending across the lower portion of the base or frame is secured a rod B'.

Mounted upon the rear portion of the top or table A' and centrally thereof as regards its width is a magazine or receptacle C, into which the cakes of soap or other articles 1 to be wrapped are deposited and from which they are successively ejected and carried forward through the machine as their inclosure within their respective wrappers are being effected. This magazine or receptacle may be constructed in various forms. We prefer, however, to construct it in the form of a vertically-disposed tube or channel-way with the cross-section of its interior of the proper size and shape to receive the cakes of soap or other articles as they are delivered to it flatwise and hold them in such transverse relationship with one upon the other in a single tier until ejected therefrom. As thus constructed the deposition of the cakes of soap or other articles in this magazine or receptacle may be effected by hand. We prefer, however, to accomplish this result by mechanical means, and to that end we make use of an endless band or apron C', which, disposed in approximately horizontal relationship and in proper position with respect to the magazine or receptacle C, is supported upon a pulley $C^2$ and a corresponding pulley, (not shown,) around both of which it passes and travels. As thus disposed it receives the cakes of soap or other articles 1, that are supplied to the upper surface of its top ply, and carries them forward to and deposits them in the magazine or receptacle C. To permit of this being accomplished, the pulley $C^2$, over which the endless band or apron passes, is fixedly secured to a shaft $c'$ and is supported from and above the top or table A' through the intervention of stands $C^3$, which, secured at their lower ends to the upper side of the top or table A' by screws or otherwise, extend upwardly therefrom and are severally provided with suitable bearings $c$, in which the opposite ends of the shaft $c'$ are respectively journaled, while to impart the required rotation to this pulley $C^2$, and through it to the endless band or apron C', we make use of a sprocket-chain $c^2$, which passing around a suitable sprocket-wheel $c^3$, secured to the main driving-shaft B, extends to and around a corresponding sprocket-wheel $c^4$, that is in turn secured to the end of a short shaft $c^5$. As thus connected with the driving-shaft B this short shaft $c^5$ is journaled in a suitable bearing formed in or supported upon one of the stands $C^3$ and has secured to its opposite end a spur-gear $c^6$, which through an intermediate spur-gear $c^7$ communicates motion to a corresponding spur-gear $c^8$, fixedly secured to the shaft $c'$. By these means not only is the pulley $C^2$ properly supported upon the top or table A', but the rotation of the same at the required speed, and with it the movement of the band or apron C', in the proper direction insured.

With the parts constructed and arranged as above described and the machine operated the cakes of soap or other articles 1, supplied to the upper surface of the top ply of the endless band or apron C' and standing on one of their edges, will be carried forward thereby and deposited in the upper end of the magazine or receptacle in transverse relationship thereto, with the bottom side of one cake or article resting upon the upper side of the other, and so on throughout the series, and in order to insure of the proper arrangement of the cakes of soap or other articles in the magazine or receptacle we preferably extend the upper ends of the side and front walls $c^9$ and $c^{10}$ of the magazine or receptacle C upwardly in a curvilinear form over the pulley $C^2$, whereby the space between the endless band or apron C' and the interior of the front wall $c^{10}$ of the magazine or receptacle shall be such that, while permitting of the cakes of soap or the other articles assuming radial positions with respect to the pulley $C^2$ in traveling over the same with the band or apron C', it prevents them from prematurely falling from those positions and assuming any others than those of transverse positions when deposited in the magazine or receptacle. To this end we find it convenient to employ in the construction of the side walls $c^9$ of this magazine or receptacle C narrow angle-bars, which, secured at their lower ends to the upper surface of the top or table A' by screws or otherwise or formed as a part of the bases of the stands $C^3$, extend upwardly from their lower ends in a vertical direction to near a line drawn horizontally through the axis of the shaft $c'$, where, curving rearwardly in a line substantially concentric to the periphery of the pulley $C^2$, they connect at their upper ends with upwardly-projecting portions of the stands $C^3$ and receive the front wall $c^{10}$, which is secured to them by screws or rivets, as shown. With the front and side walls of the magazine or receptacle constructed as thus described the rear walls $c^{11}$ thereof are preferably constructed in the form of a plate, which, supported from the upper surface of the top or table A' through the intervention of a bracket $c^{12}$ and suitable screws, extend upwardly vertically from its lower end for a certain distance and then inclines rearwardly, with its upper end in close relationship to the periphery of the wheel $C^2$, whereby to cause the cakes of soap or other articles deposited in the magazine or receptacle to move forward toward the front wall thereof and be thereby carried away from contact with the endless band or apron as it is carried forward by the pulley $C^2$. As thus constructed a magazine or receptacle for the reception of the articles to be wrapped is produced which not only insures of the proper deposition of such articles therein, but which as a consequence of the narrow width of the angle-bars constituting its side walls $c^9$ at the same time permits of the inspection of those articles in the magazine or receptacle as well as ready access to them when required.

With the cakes of soap or other articles deposited in the magazine or receptacle C, as above explained, the lower cake of the tier may rest upon the upper surface of the top or table A' and in that position be ejected and carried forward through the machine to undergo the wrapping operation. We prefer, however, to support it upon a block $c^{13}$, which, arranged beneath the lower end of the magazine or receptacle C, extends forward for some distance, whereby the line of travel of the successive cakes of soap or other articles as they are ejected from the bottom of the magazine or receptacle may be carried forward in a line with the wrapping devices, which are disposed some distance above the top or table A', as shown in Fig. 2.

For ejecting the successive cakes of soap or other articles from the magazine or receptacle C we make use of a plunger D, which is constructed with an overhanging arm or bar $d$, that is equipped at its forward end with a head $d'$, which is of approximately the same size in vertical cross-section as the edge of the cake of soap or other article in connection with which it is to be used. As thus constructed this plunger D is fitted to slide in a suitable slot or guideway $a'$, formed in the rear portion of the top or table A' in line with the lower end of the magazine or receptacle, and is provided on its under side with a tongue, which projects downwardly through the top or table A', and has secured to its lower edge by suitable screws or otherwise a plate $d^2$, which is provided on its under side with a depending lug $d^3$. As thus mounted the overhanging arm $d$ of this plunger D, with its head $d'$, may be reciprocated back and forth through the lower end of the magazine or receptacle C, and to permit of which aperture $c^{14}$ and $c^{15}$, of approximately the size of a cake of soap or other article, is respectively formed through the front and rear walls thereof.

The means for imparting a back-and-forth reciprocating movement to the plunger to cause it to alternately pass through and withdraw from the lower end of the magazine or receptacle C may be of various forms. We prefer, however, to employ for this purpose a lever D', which, loosely fulcrumed at its lower end upon the rod B' and jointed at its upper end to the depending lug $d^3$ through the intermediary of a link $d^4$, is connected with the main driving-shaft B through the intervention of an eccentric $d^5$, fixedly secured thereto, and a coöperating eccentric-strap $d^6$, surrounding the eccentric and connecting at its opposite end with the lever D'. By these means a back-and-forth reciprocation is imparted to the plunger D at every rotation of the main driving-shaft, and at each forward reciprocation thereof the overhanging arm $d$ of the same, with its head $d'$, forced through the lower end of the magazine or receptacle and the lower cake of soap or other article resting upon the block $c^{13}$ ejected therefrom and carried forward over such block and deposited in the tumble-box F. As the lower cake of soap or other article is thus ejected from the lower end of the magazine or receptacle C by the head $d'$ of the plunger the cakes of soap or other articles remaining drop down upon the upper side of the overhanging arm $d$ of the plunger and rest thereon until it is withdrawn from under them in its backward reciprocation, when they again drop down and rest upon the block $c^{13}$ in proper position for the ejection of the next lower cake or other article at the next forward reciprocation of the same, and so on. Thus, as will be seen, the block $c^{13}$ and overhanging arm $d$ of the plunger alternately serve to support the cakes of soap or other articles in the magazine or receptacle, the block $c^{13}$ performing that function when the overhanging arm and head of the plunger is withdrawn from the lower end of the magazine or receptacle and the overhanging arm and head accomplishing that result after ejecting the bottom cake or other article and while extending in across the lower end of such magazine or receptacle.

In being ejected from the lower end of the magazine or receptacle and carried forward into the tumble-box F the cake of soap or other article in its transit encounters the wrapper or wrappers 2, in which it is or are to be incased, which travels or travel downward in the direction of their length across the path of movement of the former, as shown in Fig. 15, and is or are carried forward by it into the tumble-box and by that operation folded over its top, bottom, and front edges, as shown in Fig. 16. In some instances but a single wrapper for each cake or article will be employed, while in others a plurality of these wrappers will be found advantageous—as, for instance, where the cake of soap or other article is moist or greasy or the exclusion of the outer air is desirable. Then a waterproof or chemically-treated wrapper with an outer one may be employed. For supplying these wrappers to the article to be wrapped any of the ordinary or preferred forms of paper-feeding or wrapper-delivering devices may be employed, and the number of these delivering devices will be dependent upon the number of wrappers that is or are to be applied to the successsve articles. When a single wrapper for each article is employed, then only one wrapper-delivering device will be necessary. On the other hand, when a plurality of wrappers are applied to each article then a plurality of these wrapper-delivering devices will be required. In the form of the invention, however, which we have selected for purposes of illustration we have shown two of these wrapper-delivering devices E and E', which are supported above the upper side of the top or table A' near the delivery end of the machine by two upright frames $E^2$, which, secured at their lower ends to the top or table A' by screws or otherwise, extend upwardly therefrom and are suitably tied together and braced by a cross-piece $e$ and a plate $e'$, which extend across from one to the other and are respectively secured at their opposite ends to the front and rear edges thereof. Within and upon these frames $e^2$ the operating parts of the wrapper feeding and delivering devices are mounted and arranged, and as these operating parts are identical in construction and operation in both devices the same letters of reference are employed to designate the different parts of each.

In these wrapper-feeding devices the boxes or magazines for holding the wrappers are each composed of the vertical side walls $e^2$ and of the wire grating $e^4$, of which the side walls $e^2$ are secured to horizontal ribs $e^3$ on the inner side of the frame $E^2$, and the wire grating $e^4$ extends across from one side wall to the other and forms the bottom of the box or magazine upon which the wrappers in bulk are deposited. As thus constructed the selection and feeding forward of the successive wrappers as required is effected by rubber-faced sectors $e^5$, which work upwardly through the grated bottom $e^4$ of the box or magazine and contacting with the under side of the mass raise it slightly and not only detach the lower wrapper therefrom, but force it forward toward the rubber-faced roller $e^6$ and its companion rubber feed eccentric $e^7$. For rotating the shaft $e^8$ of the roller $e^6$ of the lower feeding mechanism a pinion $e^9$ is employed, which gears with a similar pinion $e^{10}$ on a stud $e^{11}$, projecting from the side of the frame $E^2$, and carries a sprocket-wheel $e^{12}$, which latter in turn carries a chain $e^{13}$, that passes around the sprocket-wheel $e^{14}$ on the driving-shaft B.

In like manner for operating the upper wrapper-feeding mechanism E' the shaft $e^8$ at its right-hand end carries a sprocket-wheel $e^{15}$ and imparts motion to the wheel $e^{16}$ on the upper shaft $e^{17}$ by means of the chain $e^{18}$, while the shafts of the sectors $e^5$ are journaled in the frames $E^2$ and are provided with pinions $e^{19}$, which are geared together and to the gear on the roller $e^6$ through the intermediaries of pinions $e^{20}$, as shown in Fig. 2.

The rubber-faced eccentrics $e^7$ are stationary and not adapted to touch the roller $e^6$, but are set away from the same a distance equal to the thickness of a wrapper being fed from the supply-box, and this distance can be regulated to a very minute degree by turning its shaft in the journal-boxes in the frames $E^2$ and clamping the same when set by means of the set-screws $e^{21}$. When a wrapper is being fed forward, it is propelled by the friction of the roller $e^6$, and any wrapper which may adhere to its top surface meets with the resistance offered by the frictional force of the eccentric $e^7$ and is held while the lower wrapper passes onto the rollers $e^{22}$ and $e^{23}$.

The roller $e^{22}$ is rubber-faced and is normally stationary, its shaft being adjustably held in the frame by the set-screw $e^{24}$, whereby to permit of the adjustment of its roller $e^{22}$ toward and away from its companion roller $e^{23}$ to suit the space between them to the thickness of the wrapper employed; but the shaft $e^{25}$ of this latter roller is provided with a gear-wheel $e^{26}$, which is driven by the pinion $e^{10}$. The roller $e^{22}$, being thus rotated by the wrapper passing between it and the roller $e^{23}$, serves also as a further precaution against the feeding of more than one wrapper at a time by the devices, and the single wrapper, which finally passes these rollers, is guided into the chute $E^3$ by the guide-frame $e^{27}$.

At the mouth of each chute $E^3$ are rollers $e^{28}$, loosely journaled in slotted brackets $e^{29}$, secured to the plate $e'$ and bearing freely by means of gravity on the rollers $e^{23}$. These rollers guide the wrapper into the chute $E^3$ and hold it there until its upper edge is reached, when it is allowed to fall in time for the inward movement of the plunger. If the wrapper from the upper box is intended for the inner wrapper, the driving mechanism for the two feeding devices are so set that the upper wrapper is released and allowed to pass down the chute before the lower wrapper is freed, thus insuring of its being next to the plate $e'$. This release of the wrappers occurs after the plunger has gone forward with the soap or other article to be wrapped, and the wrappers pass through the slot in the rear end of the block $c^{13}$ and onto the supporting-fingers $d^8$, carried by the block $c^{13}$, where they stand in a position, such as shown in Fig. 15, ready to receive the cake of soap or other article with the next inward movement of the plunger. It is obvious that these fingers $d^8$ may be so disposed or adjusted as to allow the wrapper or wrappers to drop to a depth necessary for the reception of the soap at any point along its or their length, and in Figs. 15 and 16 we have shown the cake of soap $l$ as being so deposited in the wrapper that the wrapper when folded horizontally along the bottom of the cake will about cover it. This horizontal fold is accomplished on the under side by the wall $d^9$ of the slot in the block $c^{13}$ and on the upper side by the plate $e^{30}$, which forms the inner wall of the chute, both being effected when the soap is forced in by the plunger, and as so enveloped it is forced on into the tumble-box F. When the plunger then begins its reverse movement, the soap thus wrapped is left in the tumble-box, and in order to prevent it from adhering to the head of the plunger when the plunger is withdrawn and following it in its backward movement the spring-fingers $d^{10}$, carried by brackets $d^{11}$ on the plate $e'$, are employed, which, engaging with the soap or other article, detach it therefrom and at the same time smooth down the wrapper on the top thereof.

The construction of the tumble-box F is illustrated in detail in Figs. 7, 8, 9, and 10, in which the box is shown as provided with trunnions $f$, that are journaled in bearings $f'$, secured to the table A', with a rectangular opening $f^2$ formed through the box, in which slides the ejector G. Through the upper and lower walls $f^3$ of the box slide the lateral studs $f^4$ of the friction-plates $f^5$, which bear upon the soap or other article when it is shoved by the plunger into the opening $f^2$ and hold the same while the box rotates to complete the folding of the wrapper. The ends of the plates $f^5$ are turned outward into slots cut in the extensions $f^6$ of the walls $f^3$, so that they will offer no resistance to the entrance of the soap or other article into the opening $f^2$ but guide it therein, while the studs $f^4$ are encircled by springs $f^7$, carried in sockets in the walls of the box and exert an inward pressure upon the plates and force them inward toward each other, the limit of this inward movement being determined by pins passing through the studs $f^4$, which at the same time also serve to retain the plates in their proper relation to the box and to each other.

Rotatively mounted on one of the trunnions $f$ is a sleeve $f^8$ and gear-wheel $f^9$, the latter of which is free to rotate in one direction; but when this rotation is reversed the spring-pressed pawls $f^{10}$, carried by the gear-wheel within a recess in the end of the sleeve, engage with the teeth of a disk $f^{11}$, keyed to the trunnion, and cause the tumble-box to rotate with it. This rotation of the gear-wheel $f^9$ is effected by a rack-bar $f^{12}$, with which the gear-wheel meshes and which sliding in a suitable slot formed in the table A' is actuated by the lever $f^{13}$, which in turn is pivoted at $f^{14}$ to the main framework and is connected with the rack-bar by the link $f^{15}$. With the gear-wheel $f^9$ thus actuated from the lever $f^{13}$ this lever is oscillated from the main driving-shaft B through the intermediaries of an eccentric $f^{16}$, which is fixedly secured to such shaft, and an eccentric-strap $f^{17}$, which, encircling the eccentric at one of its ends, is adjustably connected with the lever at its other.

When the soap, with the wrapper folded about its front edge and top and bottom sides, as shown in Fig. 16, is pushed forward by the plunger, it encounters the ejector G, which will be presently described, and slides the same to the rear end of opening $f^2$ in the tumble-box F. The soap being thus deposited almost entirely within the box, the eccentric $f^{16}$ begins to swing the lever $f^{13}$ forward, when the pawls $f^{10}$ engage the teeth of the disk $f^{11}$ and turn the tumble-box one-half a revolution or into a position to discharge the soap or other article into the channel H between the two horizontal plates H' and H².

While the soap is being received by the tumble-box and ejected therefrom, it is necessary that the box be held rigidly with the opening $f^2$ in alinement with the plunger D when the same is in operation, and to insure of this being accomplished we provide the locking devices illustrated in Fig. 7 and with less distinctness in Fig. 1. Of these locking devices the sleeve $f^8$ has two openings $i$, which coincide with the normally horizontal sides of the tumble-box, and projecting through the table A' is a pin $i'$, which is forced upwardly by a spring $i^2$. The pin and spring are carried by a slotted shell $i^3$, which is secured to the table by a nut $i^4$, and in a slot $i^5$ in the lower end of the pin works the finger $i^6$ of a bell-crank lever I, pivotally supported at $i^7$ in a hanger depending from the under side of the top or table A' and carrying at the end of its lower arm a roller $i^8$, which by the action of the spring $i^2$ is held against the face of the cam $i^9$ on the main driving-shaft B. It will be observed that the elevated face of the cam $i^9$ holds the pin $i'$ out of one or the other of the holes $i$ for a short time only or only long enough for the semirotation of the tumble-box to be effected, when it will be again inserted therein and firmly lock the tumble-box in its semirotated position.

The semirotation of the tumble-box containing the soap or other article to be wrapped causes the free end or ends of the wrapper or wrappers to fly upward and around, to prevent which a plate J is employed, against which it or they strike and which is secured to a shaft $j$, loosely carried by brackets $j'$, depending from the frames E². As thus mounted this plate is adapted to swing with the shaft $j$, and while it is capable of yielding against the pressure of a spiral spring $j^3$ its movements are limited by lugs $j^2$, to the end that the wrapper or wrappers and the corners of the soap may not encounter too hard a body when the former is or are folded down on the two remaining sides of the soap or other article. The tumble-box F after receiving the cake of soap or other article and rotating through a semirotation brings such soap or other article to the rear of the tumble-box, and the wrapper or wrappers occupies or occupy substantially the position thereon shown in Fig. 17, in which it or they are in readiness to have their ends tucked and folded, as will now be described.

In the operation which brings the soap to its present position it will be understood that these cakes or bars of soap or other articles follow each other in close order and assist each other in the various operations which finally accomplish the complete wrapping of each as it reaches the last stage. The ejector G, which had prior to the semirotation of the tumble-box F occupied a position protruding from the rear side of the box, now occupies a similar position in the front side. This ejector is composed of two vertical ends $g$, parallel with the axis of the tumble-box and united by a body $g'$ at right angles thereto. The ends $g$ carry pivoted plates $g^2$ to provide for any unevenness of the sides of the articles to be wrapped, the pivots $g^3$ being carried by plates $g^4$. Tongues $g^5$ in the upper and lower faces of the ejector fit in corresponding grooves in the walls of the tumble-box and guide the ejector in its movements through the opening $f^2$, while a pin $g^6$ slides in a slot in one of the walls and not only prevents the ejector from leaving the box, but limits its movement therein.

When the motion of the tumble-box has been arrested and the plunger D begins another forward movement, it pushes out the lower cake of soap from the pile and starts it through the operations already described. This latter cake of soap after encountering its wrapper or wrappers moves forward and meets the pivoted plate $g^2$ at that side of the ejector and forces it through, with the ejector, to the other side of the tumble-box. While this movement of the ejector is taking place the soap, with the wrapper or wrappers folded about it, is being forced out of the tumble-box and into the channel-way H between the parallel plates H′ and H² to an extent equal to its width or into the position shown by the numeral 3 in Fig. 2, where it remains at rest while the tumble-box makes another half-revolution, as heretofore explained. The plate H′ is supported by the table A′, while the plate H² is carried by the cross-brace $e$, to which it is attached by suitable lugs or bolts. While the soap or other article remains in this its first position between the plates H and H′, the first operation is performed in the tucking and folding of the ends of the wrapper or wrappers, which now envelops four sides of the soap, and this is done by the blades $h$, which are now adjusted to descend while the soap is at rest. These tucking-blades $h$ are secured to a lateral bar $h'$, whose ends are carried by the two vertical rods $h^2$, which slide through suitable bearings $h^3$ in the bed or table A′ and which below the table are carried by a cross-head $h^4$, the whole constituting a rectangular frame moving vertically when the tumble-box is making its half-revolution.

The lower side of the cross-head is provided with a lug or lugs $h^5$, to which is pivoted the longer or horizontal arm of a bell-crank lever $H^3$, carried by and pivoted to a bracket $h^6$, depending from the lower side of the table A′, while what is substantially the vertical arm of the lever $H^3$ carries a roller or stud which engages with a cam-groove in the disk $h^7$, secured to the main driving-shaft B. This grooved disk is more clearly shown in Fig. 22. When this rectangular frame is actuated by the bell-crank lever $H^3$, the tucking-blades $h$ descend, and as their distance apart is about equal to the length of the cake of soap or other article that is being wrapped they carry down the outwardly-projecting margins of the wrapper or wrappers on the upper side of the soap or other article from a horizontal to a vertical position and fold these margins downward over the ends of such cakes or articles, as shown in Figs. 11 and 18. In these positions the tucking-blades are maintained for a sufficient length of time to enable the rear projecting margins of the wrapper or wrappers to be folded in upon the portions of the latter that were carried down by the tucking-blades in their descent. For folding in these rear projecting margins the folding-blades K are employed. These blades are preferably constructed in the form shown in the drawings and are mounted at the proper distance apart upon the shaft $k$, which is journaled in suitable bearings secured to the upper side of the table or top A′ and is rotated from a sprocket-wheel $k^3$ on the main driving-shaft B through the instrumentality of a sprocket-chain $k^2$, which passes around such sprocket-wheel $k^3$ and around a similar sprocket-wheel $k'$, fast on the shaft $k$. By these means, as will be seen, a continuous rotation is imparted to shaft $k$ and through it to the folding-blades K, whereby after the margins of the wrapper on the upper side of the soap have been folded down by the tucking-blades $h$ these folding-blades are caused to sweep in over the ends of the soap or other article transversely of the same toward the front thereof, and thereby fold in the rear projecting margins of the wrapper or wrappers upon the portions of the same that were carried downward by the tucking-blades. The rear end margins of the wrapper or wrappers having been thus folded in upon the parts that were folded down by the tuckers $h$, the continued rotation of these rotating blades not only fold down still farther the margins already folded over by them, but likewise fold down into vertical positions below the plate H' the bottom projecting margins as well, drawing down with them at the same time and folding over upon the bottom margins the front end margins of the wrapper or wrappers into the positions shown in Figs. 12 and 13. In these positions the projecting end margins of the wrapper or wrappers are left after the tucking-blades $h$ are raised and the rotating blades K swung downward away from the same in their further rotation. With the projecting margins of the wrapper or wrappers thus tucked and folded the plunger D again feeds forward another cake of soap or other article from the magazine or receptacle C to be wrapped, and in doing this it forces the cake of soap or other article already in the tumble-box F out of the same and into the channel H, with the consequent result that the cake of soap or other article already acted upon by the tucking-blades and the rotating folders is carried forward into the position shown by the numeral 4 in Fig. 2 away from those devices and past the stationary folding-blades L and the rear ends $l'$ of the upwardly-inclined folders $l$, which, with the folding-blades L, are made flexible and in blade form, whereby, while fixedly secured in proper relationship to the line of travel of the articles being wrapped, they are yet capable of yielding to any variation in the lengths of the different cakes of soap or other articles that may be passed between them. In being thus moved past the rear ends of the folding-blades L and the rear ends $l'$ or the upwardly-inclined folders $l$ the forward end margins of the wrapper or wrappers that were drawn down and folded over upon the bottom margins thereof by the rotating blades K are more closely folded down against the ends of the cake of soap or other article and held in those positions, while the downwardly-extending angular portion of the bottom margins engaging with upper edge $l^2$ of the rear ends $l'$ of the upwardly-inclined folders $l$ raise that portion of the margins upwardly into horizontal positions, as shown in Fig. 20. In this relationship the cake of soap or other article is left until the plunger D feeds forward another cake of soap or other article, when the cake or article just acted upon by the folding-blades L and by the rear ends $l'$ of the upwardly-inclined folders $l$ is carried forward in the channel H by the accession of another cake of soap or other article from the tumble-box F and moved past the upwardly-inclined body portion of the folders $l$ into the position shown by the numeral 5 in Fig. 2, with the result that the upwardly-inclined edges $l^3$ of these devices fold up against the ends of the cakes of soap or other articles the lower portions of the margins of the wrapper or wrappers that was raised to a horizontal position by the rear ends $l'$ of these folders as the articles were carried past them, thereby completing the wrapping of the articles, as shown in Fig. 21. The wrapping of the cake of soap or other article being thus completed, the incased cake or article at the next accession of a cake of soap or other article to the channel H is discharged from the machine and may be deposited in a suitable receptacle or carried away by an endless band or apron, as may be desired.

The positions of the cakes of soap or other articles during the various stages of the operation of the machine being thus indicated, it will be readily understood from the foregoing description that the progress of the soap or other articles to be wrapped during these operations is intermittent and that each article to be wrapped plays a very important part in the result attained.

In Figs. 11, 12, and 13 we have illustrated the final operations in the folding of the end margins of the wrapper or wrappers, while in Figs. 15 to 21 we have illustrated the various folds which the wrapper or wrappers are subjected to in order to put such a wrapper on the article, as is shown in Fig. 21.

In Fig. 23 is illustrated a modified form of device for driving the pulley $C^2$, wherein it is rotated intermittently instead of continuously, as shown in Figs. 1 and 2. In the means here shown we employ an eccentric M, secured to the driving-shaft B and carrying a strap $m$, to which one end of the reciprocating rod $m'$ is attached, the other end of the rod being pivoted, by means of the stud $m^2$, to the swinging arm $m^3$, whose hub $m^4$ encircles the pulley-shaft $c'$. To this pulley-shaft is secured a ratchet-wheel $m^5$ and a pawl $m^6$, carried by the stud $m^2$, which former engages with the teeth of this ratchet-wheel when the rod is moved in one direction and moves the same through a predetermined arc and leaves it at rest when the rod is moved in an opposite direction. This device may be so adjusted as to deposit a cake of soap or other similar article in the path of the plunger at each backward movement of the latter or be otherwise adjusted to deposit the successive cakes of soap or other articles in the magazine or receptacle at any other times with respect to the movements of the plunger, as may be desired.

With the parts constructed and operated as above explained a machine for incasing cakes of soap or other articles is produced which, while simple in construction and capable of rapid and efficient operation, is at the same time admirably suited to the purposes for which it is intended.

While in the foregoing we have described the best means contemplated by us for carrying our ideas into practice, we wish it distinctly understood that we do not limit ourselves thereto, as it is obvious that we may modify the same in various ways without departing from the spirit of the invention.

Having now described our invention and specified the best means contemplated by us for carrying it into effect, we claim and desire to secure by Letters Patent of the United States—

1. The combination, with mechanism for receiving and delivering cakes of soap and other articles, devices for selecting and ejecting them therefrom, of a tumble-box, tucking devices, and a pair of vertically-acting rotating folding-blades, mounted at a proper distance apart on their operative means, that are caused to rotate transversely across the ends of the successive cakes of soap or other articles, and coöperating folding devices arranged to operate upon the wrappers after they have been ejected from the tumble-box with their respective cakes of soap or other articles, substantially as described.

2. The combination, with a magazine or receptacle for receiving cakes of soap or other articles, and a plunger for selecting and ejecting them therefrom, of a tumble-box, and tucking devices, a pair of vertically-acting rotating folding-blades, mounted at a proper distance apart on their operative means, that are caused to rotate transversely across the ends of the successive cakes of soap or other articles, and coöperating folding devices arranged to operate upon the packages after they have been ejected from the tumble-box, whereby said cakes of soap or other articles are inclosed in suitable wrappers, substantially as described.

3. The combination, with a magazine or receptacle for receiving cakes of soap or other articles, and a reciprocating plunger for selecting and ejecting them therefrom, of mechanism for supplying wrappers for incasing such cakes or other articles, a tumble-box, and tucking devices, a pair of vertically-acting rotating folding-blades mounted at a proper distance apart on their operative means, that are caused to rotate transversely across the ends of the successive cakes of soap or other articles, and coöperating folding devices for operating upon the packages after they have been ejected from the tumble-box, substantially as described.

4. The combination, with a magazine or receptacle for receiving cakes of soap or other articles, and a reciprocating plunger for successively selecting and ejecting them therefrom, of mechanism for feeding wrappers for such cakes of soap or other articles in a direction of their length across the line of travel of these cakes or articles, a tumble-box, and tucking devices, a pair of vertically-acting rotating folding-blades mounted at a proper distance apart on their operative means, that are caused to rotate transversely across the ends of the successive cakes of soap or other articles, and coöperating folding devices arranged to act successively upon the packages after they have been ejected from the tumble-box, substantially as described.

5. The combination, with a magazine or receptacle for receiving cakes of soap or other articles, and a reciprocating plunger for successively selecting and ejecting them therefrom, a mechanism for feeding a plurality of wrappers to each of such cakes of soap or other articles in a direction of their length across the line of travel of these cakes or articles, a tumble-box, and tucking devices, a pair of vertically-acting rotating folding-blades mounted at a proper distance apart on their operative means, that are caused to rotate transversely across the ends of the successive cakes of soap or other articles, and coöperative folding devices arranged to act upon the packages after they have been acted upon by the tumble-box, substantially as described.

6. The combination, with a magazine or receptacle for receiving cakes of soap or other articles, and a reciprocating plunger for coöperating therewith, of wrapper-feeding devices, a tumble-box, and vertically-moving tucking-blades, a pair of vertically-acting rotating folding-blades mounted at a proper distance apart on their operative means, that are caused to rotate transversely across the ends of the successive cakes of soap or other articles, and coöperative folding devices, for successively acting upon the package after it has passed the tumble-box, substantially as described.

7. The combination, with a magazine or receptacle for receiving cakes of soap or other articles, and a reciprocating plunger for coöperating therewith, of wrapper-feeding devices, a tumble-box, vertically-moving tucking-blades, a pair of vertically-acting rotating folding-blades, mounted at a proper distance apart on their operative means, that are caused to rotate transversely across the ends of the successive cakes of soap or other articles, and coöperating stationary folding devices, substantially as described.

8. The combination, with a magazine or receptacle for receiving cakes of soap or other articles, and a reciprocating plunger for coöperating therewith, of a tumble-box, vertically-moving tucking-blades, a pair of vertically-acting rotating folding-blades, mounted at a proper distance apart on their operative means, that are caused to rotate transversely across the ends of the successive cakes of soap or other articles, and stationary folding devices constructed with upwardly-inclined upper edges, substantially as described.

9. The combination, with a magazine or receptacle for receiving cakes of soap or other articles, and a reciprocating plunger for coöperating therewith, of a tumble-box, a horizontally-disposed channel-way, vertically-moving tucking-blades, a pair of vertically-acting rotating folding-blades, mounted at a proper distance apart on their operative means, that are caused to rotate transversely across the ends of the successive cakes of soap or other articles, and stationary folding devices constructed with upwardly-inclined upper edges, arranged in proper relationship to the channel-way, substantially as described.

10. The combination with an endless band or apron upon which the cakes of soap or other articles to be wrapped are supplied, and a pulley over which such band or apron travels and by which it is supported, of a magazine or receptacle for receiving the cakes of soap or other articles supplied to and delivered by the endless band or apron, the upper portion of which magazine is formed as a curve which is approximately concentric to the periphery of said pulley, whereby the said endless band and pulley form the rear walls of the upper curvilinear portion of the magazine or receptacle, substantially as described.

11. The combination, with an endless band or apron, a pulley over which it travels and is supported, and a magazine or receptacle for receiving cakes of soap or other articles supplied by such band or apron constructed with its front walls curved backward over said pulley and band or apron in a line concentric to them, whereby to insure of the cakes of soap or other articles placed upon the said band or apron being delivered into the magazine or receptacle in proper relationship thereto, and mechanism for imparting the required movement to the pulley, substantially as described.

12. The combination, with an endless band or apron and a pulley over which it travels and is supported, of a magazine or receptacle for receiving cakes of soap or other articles supplied by the said band or apron, the said magazine being curved backward over the said pulley and band or apron in a line concentric to them, the rear wall of the magazine being inclined rearwardly with the upper end of such inclination in close relationship to the pulley and apron or band thereon.

13. The combination, with a tumble-box constructed with an opening for receiving the article to be wrapped extending through the same and provided with a ratchet at one of its ends, a sleeve fitted to oscillate over the ratchet and provided with pawls for engagement therewith, and means for imparting an oscillatory movement to the sleeve, or locking devices for positively locking said tumble-box at the end of each partial rotation, substantially as described.

14. The combination, with a tumble-box constructed with an opening for receiving the article to be wrapped extending through the same and provided with a ratchet at one of its ends and with a plurality of holes, and a sleeve fitted to oscillate over the ratchet and provided with pawls for engagement therewith, of a pin for engagement with said holes, and mechanism for withdrawing and inserting this pin from and in the holes, and for imparting an oscillatory movement to the sleeve, substantially as described.

15. The combination, with mechanism for receiving and delivering cakes of soap or other articles, a reciprocating plunger for selecting and carrying forward through the machine the cakes of soap or other articles delivered to it, and mechanism for supplying wrappers across the line of travel of such cakes of soap or other articles, of a rotatable tumble-box through which the cakes of soap or other articles to be wrapped are passed, vertically-moving tucking-blades, a pair of vertically-acting rotating folding-blades mounted at a proper distance apart on their operative means, that are caused to move transversely across the ends of the successive cakes of soap or other articles, stationary folding devices, and a channel-way in which the cakes of soap or other articles are held during the folding of the wrappers about their ends, substantially as described.

16. The combination, with a tumble-box through which the cakes of soap or other articles to be wrapped are passed, and a channel-way coöperating therewith, of a plate pivotally held and yieldingly supported above the tumble-box to bend over the wrappers as they are carried over against the same by the rotation of the tumble-box and hold them folded across the path of movement of the cakes of soap or other articles as they are carried from the tumble-box into the channel-way, substantially as described.

THEODORE G. McGIRR.
MILFORD B. FERGUSON.

Witnesses to McGirr's signature:
 WM. H. APPLETON,
 R. F. SWEENY.

Witnesses to Ferguson's signature:
 D. DUNCAN CHALMERS,
 D. C. ROGERS.